United States Patent
Hayashi et al.

Patent Number: 5,132,582
Date of Patent: Jul. 21, 1992

[54] RECORDING MEDIUM TRANSFERRING APPARATUS AND VIBRATING ELEMENT USED THEREIN

[75] Inventors: Teru Hayashi, No. 4-10, Tsunashimadai, Kouhoku-ku, Yokohama-shi, Kanagawa; Hitoshi Niwa, Tokyo, both of Japan

[73] Assignees: Nihon Kohden Corporation, Tokyo; Teru Hayashi, Kanagawa, both of Japan

[21] Appl. No.: 493,544

[22] Filed: Mar. 14, 1990

[30] Foreign Application Priority Data

Mar. 20, 1989 [JP] Japan .................................. 1-68893

[51] Int. Cl.$^5$ .......................... H02N 2/00; B06B 1/06
[52] U.S. Cl. ...................................... 310/323; 310/328
[58] Field of Search ............................ 310/323, 328

[56] References Cited

U.S. PATENT DOCUMENTS

| | | | |
|---|---|---|---|
| 4,195,243 | 3/1980 | Thaxter | 310/328 |
| 4,562,374 | 12/1985 | Sashida | 310/328 |
| 4,592,710 | 6/1986 | Reifenhauser et al. | 310/328 |
| 4,613,782 | 9/1986 | Mori et al. | 310/323 |
| 4,742,260 | 5/1988 | Shimizu et al. | 310/323 |
| 4,857,791 | 8/1989 | Uchino et al. | 310/323 |
| 4,945,275 | 7/1990 | Honda | 310/323 |

FOREIGN PATENT DOCUMENTS

| | | | |
|---|---|---|---|
| 0089583 | 5/1984 | Japan | 310/323 |
| 0035178 | 2/1988 | Japan | 310/328 |
| 0228980 | 9/1988 | Japan | 310/323 |
| 0126177 | 5/1989 | Japan | 310/323 |
| 0773714 | 10/1980 | U.S.S.R. | 310/323 |
| 0773715 | 10/1980 | U.S.S.R. | 310/323 |

Primary Examiner—Steven L. Stephan
Assistant Examiner—C. LaBalle
Attorney, Agent, or Firm—Sughrue, Mion, Zinn, Macpeak & Seas

[57] ABSTRACT

A transfer apparatus for transferring a sheet-like medium has a vibrational element or elements which vibrate under control of electrical energy to move the sheet-like medium along a transfer medium. The vibrational element has a tubular hexagonal body with piezoelectric elements on its faces other then the upper and lower face. The lower face is fixed and the upper face has a projection in the shape of a ball which engages the bottom surface of the sheet-like medium during vibration of the vibrational element.

11 Claims, 5 Drawing Sheets ated apparatus of this type includes a rotating motor as a moving power source, a speed reducer and a resistance roller or the like. In the structure of this apparatus, the moving member (rotor) of the rotating motor rotates to generate rotating power which is transmitted to the resistance roller through the speed reducer. A recording medium is transmitted by the structure described above.

RECORDING MEDIUM TRANSFERRING APPARATUS AND VIBRATING ELEMENT USED THEREIN

BACKGROUND OF THE INVENTION

This invention relates to a recording medium transferring apparatus for transferring a sheet-like recording medium such as recording paper and a magnetic tape, and more particularly to an improved apparatus for transferring a recording medium by means of a vibrating member.

A conventional apparatus of this type includes a rotating motor as a moving power source, a speed reducer and a resistance roller or the like. In the structure of this apparatus, the moving member (rotor) of the rotating motor rotates to generate rotating power which is transmitted to the resistance roller through the speed reducer. A recording medium is transmitted by the structure described above.

In the conventional apparatus, in order to transmit the rotating power to the recording medium, a very complicated structure is provided. Additionally, it is necessary to adjust the arrangement of gears of the speed reducer to control the speed of the transmitting recording medium. It is difficult to control such adjustment by an electronic circuit only.

SUMMARY OF THE INVENTION

The present invention has been made in an attempt to overcome the above disadvantages, and an object of the invention is to provide a recording medium transferring apparatus which is of a compact size but can produce a sufficient transferring force and can be easily controlled in transfer speed, and also to provide a vibrating member (vibrating element) for use in such apparatus.

According to the present invention, there is provided a recording medium transferring apparatus for transferring a sheet-like recording medium CHARACTERIZED by the provision of:

a vibrating element provided in the vicinity of a transfer path and having a tubular shape, said vibrating element, when supplied with electric power, being deformed in a direction perpendicular to the axis of said tubular shape;

a drive circuit for supplying electric power to said vibrating element to drive the same so that a predetermined portion of a peripheral surface of said vibrating element will vibrate with a velocity component in a direction of transfer of said recording medium; and frictional force generating means for contacting said predetermined portion with said recording medium when said predetermined portion is in motion having the velocity component in said transfer direction, thereby producing a frictional force between the two.

A vibrating element of the present invention has a tubular shape and, when supplied with electric power, is deformed in a direction perpendicular to the axis of the tubular shape.

In the recording medium transferring apparatus of the present invention, when the drive circuit is driven, the predetermined portion of the peripheral surface of the vibrating element vibrates with a velocity component in a direction of transfer of the recording medium. The frictional force generating means contacts the predetermined portion with the recording medium, thereby producing a frictional force between the two. Therefore, during the time when the predetermined portion has the velocity component in the transfer direction, the recording medium is transferred in that direction.

The vibrating element of the present invention, when supplied with electric power, is deformed in a direction perpendicular to the axis of its tubular shape.

DETAILED DESCRIPTION OF THE PREFERRED EMBODIMENTS OF THE INVENTION

In Japanese Patent Unexamined Publication No. Hei. 1-172142 (in the names of the same inventors and assigned to the same assignee as those of the present application), which is herein incorporated by reference and which is relevant to the present invention, there is proposed a recording medium transferring apparatus including a vibrating member comprising two piezoelectric ceramic members or bimorph members which are fixedly connected together to assume an L-shape. Alternatively, there is used a strip-like vibrating member which comprises either a bimorph member or a resilient member driven by a piezoelectric ceramic member.

The L-shaped vibrating member of the former type has the disadvantage that it is inferior in rigidity. The strip-like vibrating member of the latter type has the disadvantage that its vibration amplitude is small. Therefore, in order to produce a sufficient transferring force, either of the two vibrating members are required to be of a large size, which results in the disadvantage that the apparatus incorporating such vibrating member is also increased in size. Further, if the strip-like vibrating member of the latter type is caused to vibrate at a resonance frequency, its vibrating amplitude is large enough to produce a sufficient transferring force, so that it can be of a compact size. However, in this case, it is difficult to control the speed of transfer.

An embodiment of the present invention to be described hereinbelow provides certain advantages over the foregoing structure.

An object of the embodiment of the invention is to provide a recording medium transferring apparatus which is of a compact size but can produce a sufficient transferring force and can be easily controlled in transfer speed, and also to provide a vibrating member (vibrating element) for use in such apparatus.

Figure 1:
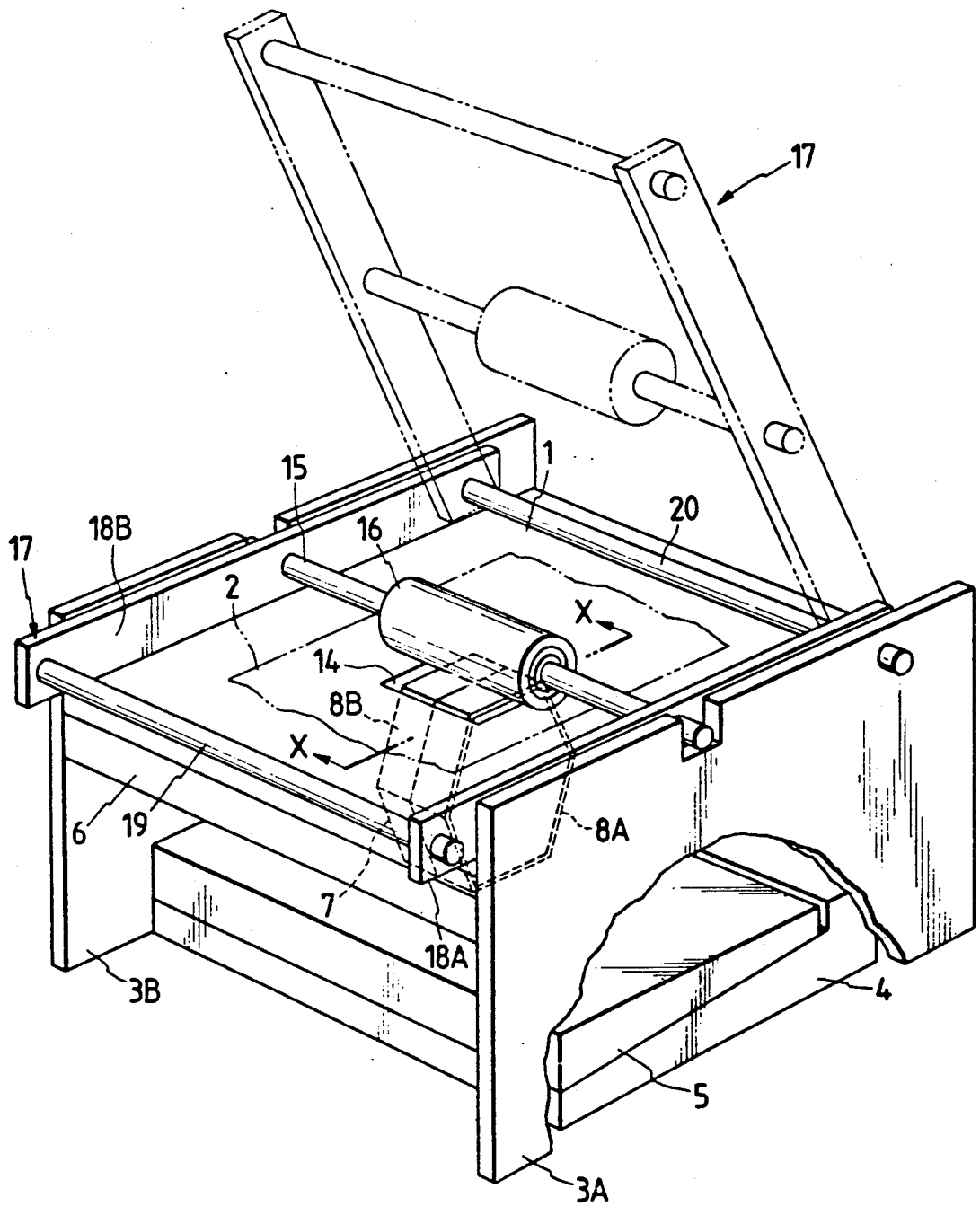
FIG. 1 is a perspective view of one preferred embodiment of a recording medium transferring apparatus of the present invention.

FIG. 1 shows one preferred embodiment of a recording medium transferring apparatus of the present invention. In this Figure, reference numeral 1 denotes a top plate on which recording paper (recording medium) 2 is placed. A pair of opposed side plates 3A and 3B are mounted respectively on lateral edges of the top plate 1 to support the same. A base 4 is mounted on the lower portions of the side plates 3A and 3B in opposed relation to the top plate 1. A vibrating element fixing member 5 is placed on and connected to the base 4. The upper surface of the vibrating element-fixing member 5 is parallel to the upper surface of the top plate 1. The upper surface of the base 4 and the lower surface of the vibrating element-fixing member 5 disposed in contact therewith are inclined with respect to the upper surface of the top plate 1. Namely, these surfaces of the base 4 and the vibrating element-fixing member 5 are tapered. The distance between the upper surface of the vibrating element-fixing member 5 and the upper surface of the top plate 1 is determined by the position of the vibrating element-fixing member 5 relative to the base 4. An adjustment screw is provided on the rear surface of the base 4, and when this screw is operated, the vibrating element-fixing member 5 slidingly moves over the upper surface of the base 4. A reinforcement member 6 is secured to the top plate 1 and the two side plates 3A and 3B to provide a firm connection. The upper portions of the side plates 3A and 3B project beyond the upper surface of the top plate 1 so as to serve as guide means for preventing the recording paper 2 from being displaced from its path of travel.

Figure 2:
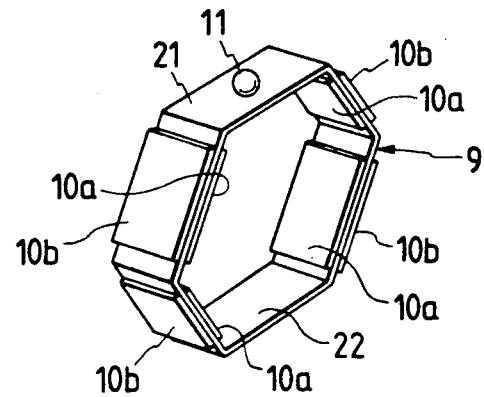
FIG. 2 is a perspective view of a vibrating element shown in FIG. 1.
Figure 3:
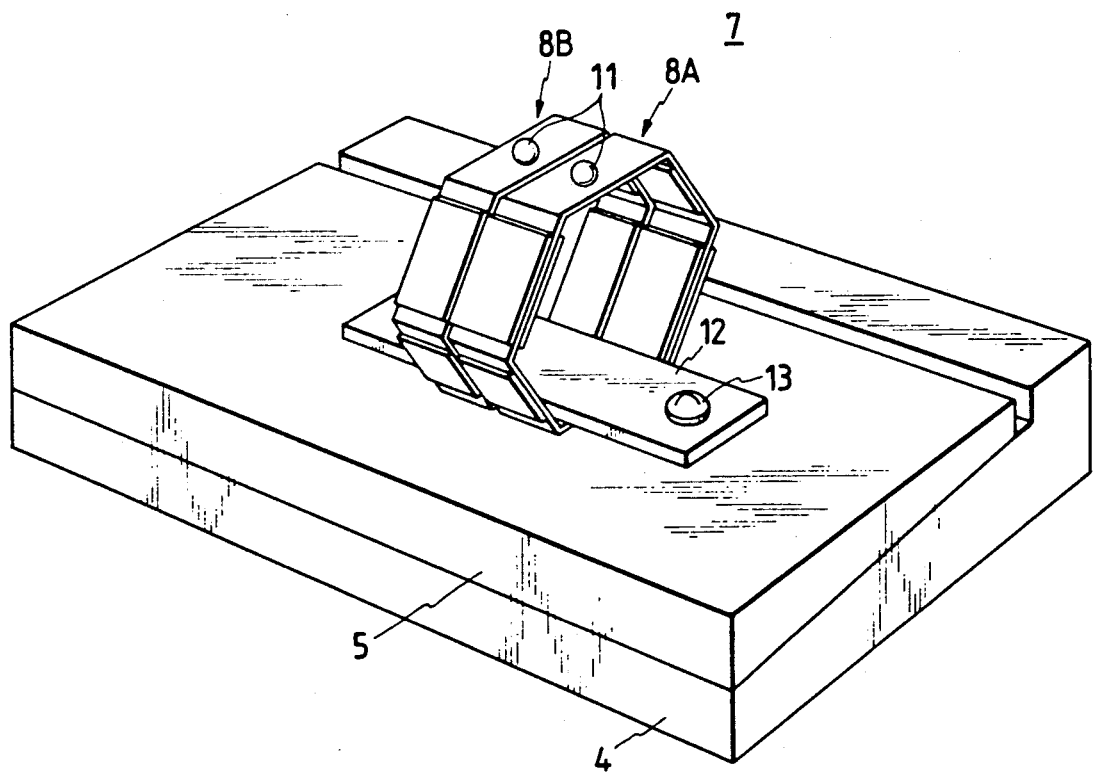
FIG. 3 is a view showing the mounting condition of the vibrating detail.
Figure 4:
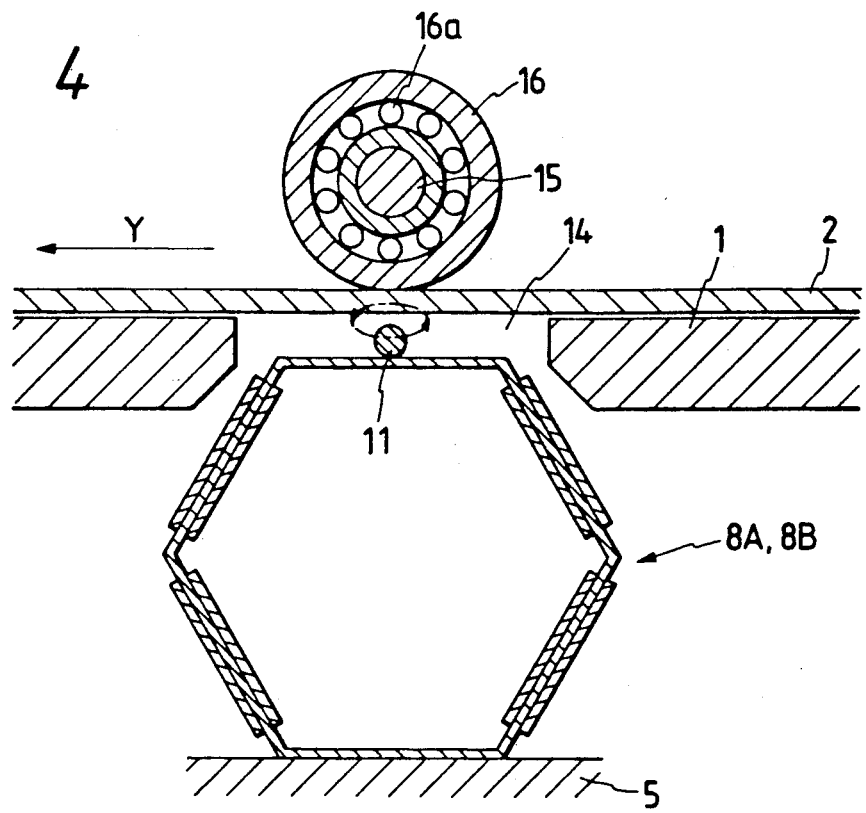
FIG. 4 is a cross-sectional view taken along the line X—X of FIG. 1.

A vibrating portion 7 comprises two vibrating elements 8A and 8B. As shown in FIG. 2, each of the vibrating elements 8A and 8B comprises a tubular body portion 9 of a hexagonal shape and piezoelectric ceramic members 10a and 10b fixedly secured to the body portion 9. The piezoelectric ceramic members 10a are fixedly secured respectively to the inner surfaces of all the flat portions of the body portion 9 except for two opposed flat portions 21 and 22. Similarly, the piezoelectric ceramic members 10b are fixedly secured respectively to the outer surfaces of the flat portions except for the above-mentioned two opposed flat portions 21 and 22. A spherical projection 11 is formed on the outer surface of the flat portion 21 of the body portion 9 at a central portion thereof. The body portion 9 and the projection 11 are made of metal. As shown in FIG. 3, the two vibrating elements 8A and 8B are juxtaposed, and are fixedly secured to the vibrating element-fixing member 5 by a holder plate 12 and a screw 13. As shown in FIG. 1, the top plate 1 has an opening 14 at its central portion. The flat portion 21 of the body portion 9 is inserted in the opening, and is disposed generally centrally of the thickness of the opening 14. The distal end of the projection 11 is slightly contacted with the recording paper 2. The height of the distal end of the projection 11 is adjusted by the above-mentioned adjustment screw mounted on the rear surface of the base 4. FIG. 4 is a cross-sectional view taken along the line X—X of FIG. 1. The recording paper is fed or transferred in a direction of arrow Y.

Referring again to FIG. 1, a roller 16 is provided above the opening 14 formed through the top plate 1, the roller 16 being rotatable about a shaft 15 disposed perpendicular to the direction of feed or transfer of the recording paper 2. The roller 16 is mounted on the shaft 15 through a ball bearing 16a as shown in FIG. 4. The roller 16 is so positioned as to rotate in contact with the recording paper 2 placed on the top plate 1. The opposite ends of the shaft 15 are connected to opposed arm members 18A and 18B, respectively. One end of each of the arm members 18A and 18B is connected to a respective opposite end of a rod-like member 19, respectively, and the other end of each of the arm members is connected to respective opposite ends of a shaft 20. The opposite ends of the shaft 20 extend respectively beyond the two arm members 18A and 18B, and are passed through holes formed in the side walls 3A and 3B, respectively. The shaft 20 is angularly movable. A roller support frame 17 is constituted by the two arm members 18A and 18B, the rod-like member 19 and the shaft 20. A frictional force generating means is constituted by the roller 16, the shaft 15 and the roller support frame 17.

Figure 5:
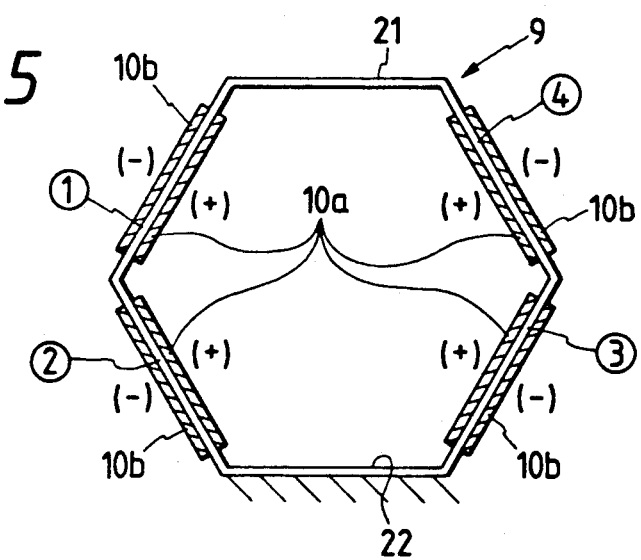
FIG. 5 is a view showing the properties of piezoelectric ceramic members of the vibrating elements.

The properties of the piezoelectric ceramic members 10a and 10b fixedly secured to the inner and outer surfaces of the four flat portions 1 to 4 of the body portion 9 are shown in FIG. 5. The piezoelectric ceramic members 10a fixedly secured to the inner surfaces of the body portion 9 are expanded when a positive (plus) voltage is applied thereto, and are contracted when a negative (minus) voltage is applied thereto. These members 10a are indicated by sign (+) in FIG. 5. The piezoelectric ceramic members 10b fixedly secured to the outer surfaces of the body portion 9 are contracted when a positive voltage is applied thereto, and are expanded when a negative voltage is applied thereto these members 10b are indicated by sign (−) in FIG. 5. The piezoelectric ceramic members 10a and 10b are connected to a drive circuit (not shown).

The operation of the apparatus of this embodiment will now be described.

First, the operator holds the roller support frame 17 shown in FIG. 1, and then rotates it about the shaft 20 to a desired angle. The recording paper is set on the top plate 1, and then the roller support frame 17 is returned to its original down position. Then, the operator turns on the drive circuit (not shown). At this time, voltages are applied respectively to the piezoelectric ceramic members 10a and 10b of one vibrating element 8A in accordance with the following sequence.

| Flat Portion Number | 1 | 2 | 3 | 4 |
|---|---|---|---|---|
| Voltage | $E_1$ | $E_2$ | $E_1$ | $E_2$ |

A voltage $E_1$ is applied to the piezoelectric ceramic members 10a and 10b secured to the two opposed flat portions 1 and 3, and a voltage $E_2$ is applied to the piezoelectric ceramic members 10a and 10b secured to the two opposed flat portions 2 and 4, wherein $E_1 = A \sin \omega t$; $E_2 = A \sin \omega t$; $A = 100$ V; $\phi = 90°$.

Figure 6A:
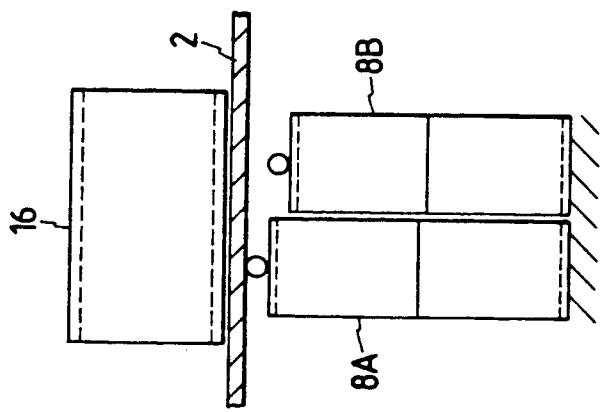
FIGS. 6(a) to 6(c), FIG. 7 and FIG. 8 are views explanatory of the operation of the apparatus of FIG. 1.
Figure 6B:
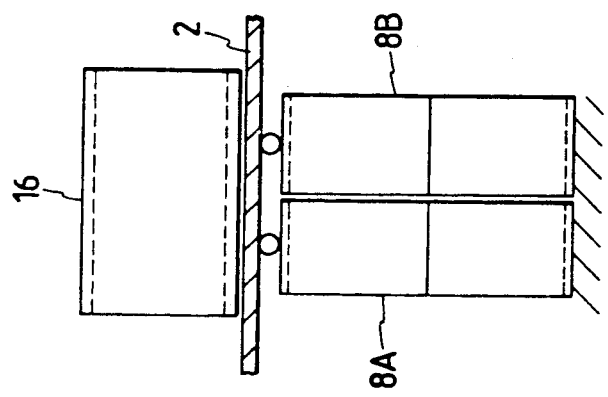
Figure 6C:
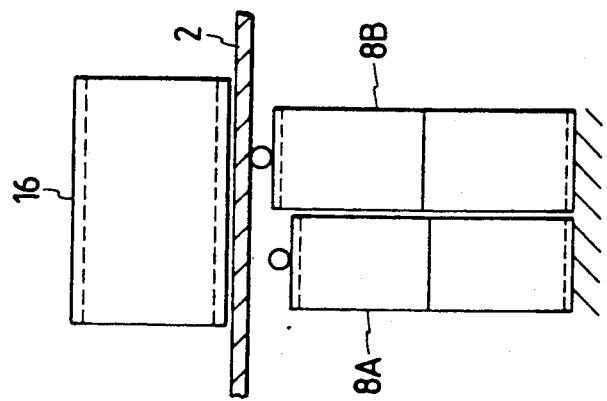

When the above voltages are applied, the vibrating element 8A vibrates, so that its projection 11 makes an oval motion in a plane perpendicular to the recording paper 2. In this embodiment, there is provided another vibrating element 8B, and this vibrating element 8B is driven so as to make a similar oval motion. However, the vibrating element 8B makes such oval motion 180° out of phase from the oval motion of the vibrating element 8A. This is shown in FIG. 6 in detail. FIG. 6 is a view as seen in the direction of transfer of the recording paper 2. One vibrating element 8A and the roller 16 hold the recording paper 2 therebetween to transfer the recording paper 2, and the other vibrating element 8B is spaced apart from the recording paper 2 and moves in a direction reverse to the transfer direction (FIG. 6(a)) Then, when the vibrating element 8A descends so that the velocity component in the transfer direction disappears, the vibrating element 8B is brought into contact with the recording paper 2, so that both of the two vibrating elements 8A and 8B are held in contact with the recording paper 2 (FIG. 6(b)). Then, the vibrating element 8B and the roller 16 holds the recording paper 2 therebetween to transfer the recording paper 2, and the vibrating element 8A is spaced apart from the recording paper 2 and moves in a direction reverse to the transfer direction (FIG. 6(c)). Then, the two vibrating elements 8A and 8B are brought into a condition similar to that shown in FIG. 6(b), and then are returned to the condition shown in FIG. 6(a). The vibrating elements 8A and 8B repeat such movement, thereby transferring the recording paper 2.

In this embodiment, since the two vibrating elements are used for transferring the recording paper 2, a smooth transfer can be achieved.

Figure 7:
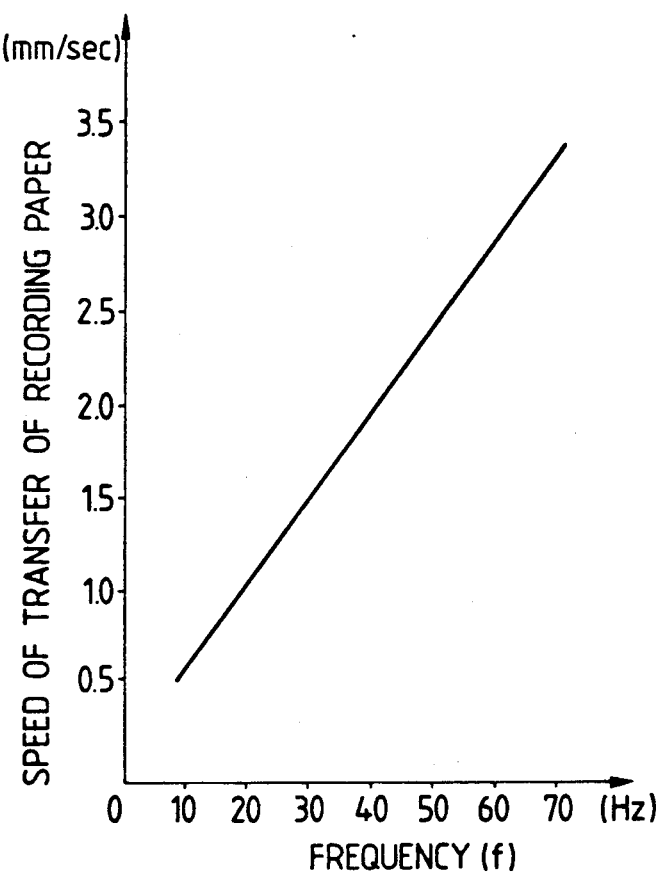

Next, the control of the transfer speed in the apparatus of this embodiment will now be described. In the above formulas ($E_1 = A \sin \omega t$) and ($E_2 = A \sin \omega t - \phi$), A and $\phi$ are constant. Namely, in the apparatus of this embodiment, the transfer speed is controlled by varying $\omega (= 2\pi f)$. FIG. 7 shows the relation between the speed of transfer of the recording paper and the frequency f. As shown in this Figure, the relation between the two is linear, and therefore it is very easy to control the speed by controlling the frequency f.

Figure 8:
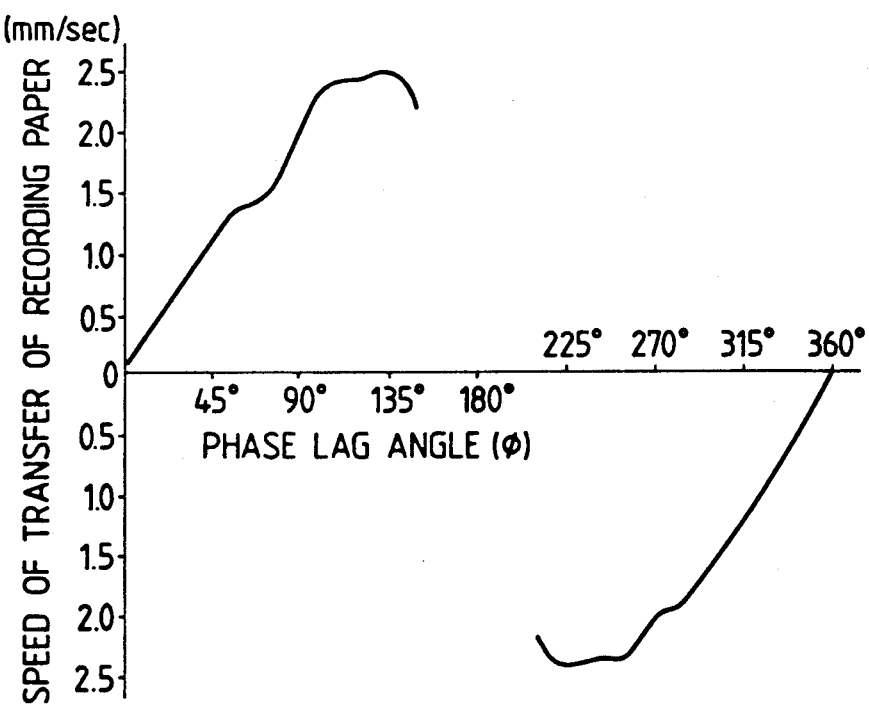

For reference purposes, FIG. 8 shows the results obtained when the speed control is effected by a phase lag angle $\phi$. As shown in this Figure, it is very difficult to control the speed by the phase lag angle o. However, the transfer in the reverse direction can be effected if the phase lag angle $\phi$ is varied.

In this embodiment, although the description has been made with respect to the hexagonal tubular vibrating elements, similar effects can be achieved if the tubular shape is cylindrical and polygonal.

In this embodiment, the piezoelectric ceramic members 10a and the piezoelectric ceramic members 10b have different properties. However, if the surfaces of these members secured to the body portion 9 have opposite polarity, all of the piezoelectric members may be the same.

In this embodiment, although the two vibrating elements are used, one or more than two vibrating elements can be used. If a plurality of vibrating elements are used, the drive circuit drives these vibrating elements in such a manner that during the driving of the vibrating elements, a predetermined portion of at least one of the vibrating elements makes motion having a velocity component in the transfer direction. Further, a row of vibrating elements may be arranged from one lateral edge portion of the recording paper toward the other lateral edge portion, in which case the vibrating elements are so driven that predetermined portions of those vibrating members bearing even numbers make oval motion 180° out of phase from the oval motion of predetermined portions of those vibrating elements bearing odd numbers, thereby transferring the recording paper in a smoother manner. In this case, if an odd number of vibrating elements are used, the opposite lateral edge portions of the recording paper are transferred by equal forces, and therefore the recording paper hardly meanders.

In this embodiment, although the roller is used as the frictional force generating means, it may be replaced by a fixed plate member having a smooth surface for contact with the recording paper. Further, two identical vibrating elements can be arranged symmetrically with respect to the recording paper, in which case the two vibrating elements are so driven that predetermined portions of the two elements move along respective identical oval paths at the same timing so as to transfer the recording paper. In this case, one of the vibrating elements serves as a frictional force generating means for the other vibrating element.

There was prepared an L-shaped vibrating element comprising a body portion and a piezoelectric ceramic member which were made of the same materials of the body portion and piezoelectric ceramic member of this embodiment, respectively. A comparison between this embodiment and the vibrating element of the present invention was made. As a result, the hexagonal vibrating element of this embodiment exhibited a rigidity six times greater than that of the L-shaped vibrating element (Conversion was made assuming that the L-shape and the hexagon were inscribed in the same circle).

According to the recording medium transferring apparatus and the vibrating element used in this apparatus, a great transferring force can be produced with a small-size construction, and the control of the transferring speed can be made easily.

What is claimed is:

1. A transferring apparatus for transferring a sheet-like medium along a transfer path; said apparatus comprising:

vibrating means provided in the vicinity of a transfer path and having a tubular shape, said vibrating means, when supplied with electric power, being deformed in a direction perpendicular to the axis of said tubular shape;

a drive circuit for supplying electric power to said vibrating means to drive the same so that a predetermined portion of a peripheral surface of said vibrating means vibrates with a velocity component in a direction of transfer of said sheet-like medium; and frictional force generating means for bringing said predetermined portion into contact with said sheet-like medium when said predetermined portion is in motion having the velocity component in said transfer direction, thereby producing a frictional force between the two wherein said vibrating means comprises at least one vibrating element, said vibrating element having a polygonal shaped body. and further comprising piezoelectric elements on several inner and/or outer faces of said polygonal shaped body and a projection on another face of said body; said projection joining and being adjacent the underside of said transfer path.

2. A transferring apparatus according to claim 1, wherein said vibrating means comprises a plurality of vibrating elements, aid drive circuit further comprising means for driving said vibrating elements so that at any time during the driving of said vibrating elements, a predetermined portion of the peripheral surface of at least one of said vibrating elements can be in a condition having a velocity component in the direction of transfer of said sheet-like medium.

3. A transferring apparatus as claimed in claim 1, wherein said drive circuit comprises means for supplying varying voltages to said piezoelectric elements in a manner and sequence to cause said body to exhibit vibration resulting in said projection moving in an oval pattern in a plate perpendicular to said sheet-like medium, whereby said sheet-like medium is contacted in one surface by said frictional force generating means and on the opposite surface by said projecting means during a time when said motion is in the direction of transfer of said sheet-like medium.

4. A transferring apparatus as claimed in claim 3, wherein said vibrating means further comprises at least one additional vibrating element substantially identical to said first mentioned vibrating element.

5. A transferring apparatus as claimed in claim 4, wherein all said vibrating elements are arranged in a row; the axis of said row being transverse the direction of transfer of said sheet-like medium.

6. A transferring apparatus as claimed in claim 5, wherein each said vibrating element has a hexagonal shaped metal body, with said piezoelectric elements being on the inner and outer surfaces of faces of the six hexagonal body faces, and with said projection being on the outer surface of the top face; said bottom face being substantially fixed relative to said transferring apparatus; and said projection being a ball shaped projection.

7. A transferring apparatus as claimed in claim 6, wherein said frictional force generating means comprises a roller engaging the top surface of said sheet-like medium to bring the bottom surface of said medium in engagement with said ball shaped projection during portions of the oval motion of said projection.

8. A vibrating element for use in a sheet-like medium transferring apparatus for transferring a sheet-like medium, said vibrating element comprising polygonal shaped tube-like metal body having plural faces including a top face and a bottom face, each face having an inner surface and an outer surface; a projection on the outer surface of said top face and piezoelectric elements on the outer and/or inner surfaces of said faces other than said top face; said piezoelectric elements being arranged to cause, when supplied with a sequence of varying voltages, said element to vibrate in a manner whereby said projection exhibits an oval motion in a plate perpendicular to the axis of said polygonal shaped body.

9. A vibrating element as claimed in claim 8, wherein said polygonal shaped metal body is hexagonal shaped.

10. The device of claim 1, wherein when a positive voltage is applied to said piezoelectric elements by said drive circuit, said piezoelectric elements on said inner and outer faces expand and contract, respectively, and when a negative voltage is applied to said piezoelectric elements, said piezoelectric elements on said inner and outer faces contract and expand, respectively.

11. The device of claim 8, wherein when a positive voltage is applied to said piezoelectric elements by said drive circuit said piezoelectric elements on said inner and outer surfaces expand and contract, respectively, and when a negative voltage is applied to said piezoelectric elements, said piezoelectric elements on said inner and outer surfaces contract and expand, respectively.

* * * * *